US 8,085,424 B2

(12) United States Patent
Hara

(10) Patent No.: US 8,085,424 B2
(45) Date of Patent: Dec. 27, 2011

(54) MULTIPLE-PORT PRINT DEVICE

(75) Inventor: Hiroyuki Hara, Osaka (JP)

(73) Assignee: Kyocera Mita Corporation, Osaka-shi, Osaka (JP)

( * ) Notice: Subject to any disclaimer, the term of this patent is extended or adjusted under 35 U.S.C. 154(b) by 1224 days.

(21) Appl. No.: 11/801,615

(22) Filed: May 10, 2007

(65) Prior Publication Data

US 2007/0263252 A1    Nov. 15, 2007

(30) Foreign Application Priority Data

May 12, 2006  (JP) .................................. 2006-133689

(51) Int. Cl.
*G06F 15/00* (2006.01)
*G06K 1/00* (2006.01)
(52) U.S. Cl. .................. 358/1.16; 358/1.1; 358/1.15
(58) Field of Classification Search ............... 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

| 6,894,792 | B1 * | 5/2005 | Abe ........................... 358/1.15 |
| 2007/0263245 | A1 * | 11/2007 | Carney et al. ................ 358/1.15 |

FOREIGN PATENT DOCUMENTS

| EP | 1 071 036 | 1/2001 |
| JP | 7 276742 | 10/1995 |
| JP | 8 305517 | 11/1996 |
| JP | 11 020242 | 1/1999 |
| JP | 2001 92610 | 4/2001 |

* cited by examiner

Primary Examiner — Thierry Pham

(57) ABSTRACT

A method that enables a multiple-port print device to perform efficient job management for each job even if the multiple-port print device is provided with parallel-processing-enabled multiple interfaces. The multiple-port print device includes a job boundary detection unit, a spool buffer, and a job management unit. By reading print job data stored in the buffer memory units from the multiple communication interfaces, and detecting the job start and end marks added to the print job data, the print job data is identified by each job boundary. The job management unit stores the print job data identified by the job boundary into the spool buffer as a spool file to spool-process the data between the spool buffer and the image processing unit.

9 Claims, 5 Drawing Sheets

MULTIPLE-PORT PRINT DEVICE

FIELD OF THE INVENTION

The present invention relates to a multiple-port print device, such as a printer and a multifunction peripherals or multi-functional peripherals (hereinafter "MFP(s)") with print function, having a parallel-processing-enabled multiple communication interfaces.

BACKGROUND OF THE INVENTION

The use of a print device is lower than that of its host computer.

In the light of such difference in use, Japanese Patent Application Laid-Open No. 7-276742 discloses a configuration of connecting a multiple-port printer to multiple host computers and parallel-processing data receive from corresponding ports by corresponding CPUs (central processing units). Alternatively, Japanese Patent Application Laid-Open No. 11-20242 discloses a configuration of parallel-processing the receive data in a time sharing manner by a single CPU.

Yet alternatively, when using a single printer for multiple host computers, a plurality of page descriptive languages are sometimes used. Japanese Patent Application Laid-Open No. 2001-92610 discloses a single-port printer supporting multiple languages.

Meanwhile, Japanese Patent Application Laid-Open No. 8-305517 discloses a configuration of spool-processing print data of print requests from multiple host computers.

However, a printer disclosed in Japanese Patent Application Laid-Open No. 8-305517 does not comprise multiple ports and uses only a single network interface. Also, since the printer spool-processes a packet, when receiving jobs that are in sequence, the printer cannot identify them by their job boundaries. Therefore, a printer thereof cannot perform job management such as to change a job execution order by the job.

An object of the present invention is to address the aforementioned issues by providing a multiple-port print device that can manage jobs by the job even when the device comprises parallel-process-enabled multiple communication interfaces.

SUMMARY OF THE INVENTION

The present invention provides methods for a multiple-port print device to perform efficient job management for each job even when the multiple-port print device is provided with parallel-processing-enabled multiple interfaces.

In a first aspect of the present invention, the multiple-port print device has multiple communication interfaces, buffer memory units, and buffer control units which store print job data received from each communication interface into each of the buffer memory units, an image forming unit which forms an image on a paper based on bitmap data, and an image processing unit which converts print data corresponding to a spool file to bitmap data and provides the data thereof to the image forming unit. The multiple-port print device comprises a job boundary detection unit which reads out print job data stored in the buffer memory units and identifies the print job data by each job boundary, a spool buffer, and a job management unit which stores the print job data identified by the job boundary as a spool file into the spool buffer to spool-process the print data between the spool buffer and the image processing unit.

In a second aspect of a multiple-port print device of the present invention according to the first aspect, the multiple communication interfaces operate according to individually dissimilar communication protocols.

In a third aspect of a multiple-port print device of the present invention according to the second aspect, the job boundary detection unit identifies print job data by each job boundary by detecting a job start mark and a job end mark defined according to a page description language and added to the print job data.

In a fourth aspect of a multiple-port print device of the present invention according to the third aspect, the job boundary detection unit defines, if detecting a next job start mark before detecting a job end mark data, data prior to the job start mark as a job end mark.

In a fifth aspect of a multiple-port print device of the present invention according to the third or the fourth aspect, the job management unit links, upon creation of a spool file, a job management block corresponding to the spool file with a job list comprising linked job management blocks performs spool-processing based on the job list, wherein each job management block includes data items of a spool file name and a job status indicating states of waiting, executing, and being completed.

In a six aspect of a multiple-port print device of the present invention according to the fifth aspect, the multiple-port print device, further comprises an operation panel on which a job list is displayed and a job modification unit to, when data of the job management block included in a displayed job list is modified through operation on the operation panel, modify one of content and status of the job accordingly.

In a seventh aspect of a multiple-port print device of the present invention according to the sixth aspect, the job boundary detection unit and the job management unit are realized by a processor and a memory unit for storing, a buffer control program, the memory unit being connected to the processor. The buffer control program includes a job boundary detection program which identifies print job data stored in the buffer memory units by each job boundary, and an event handler which, in response to the start of data reception at each communication interface, generates a thread of the job boundary detection program. The processor operates according to the buffer control program to execute operations at the buffer control units are executed.

In an eighth aspect of a multiple-port print device of the present invention according to the seventh aspect, the job management block further comprises a data item of a job start time. The job management unit generally spool-processes an print job data identified by the job boundary in a FIFO (first-in-first-out) manner, but if the job start time is specified in the job management block, the job management unit provides the spool file, as an exception, to the image processing unit according to the job start time.

According to a configuration of the first aspect of the present invention, the print job data stored in each buffer memory unit from each of multiple communication interfaces is read and identified by each job boundary, then the print job data identified by the job boundary is stored as a spool file in the spool buffer and spool-processed between the spool buffer and the image processing unit. Accordingly, each job can be effectively managed.

According to a configuration of the second aspect of the present invention, even when the multiple communication interfaces operate according to individually dissimilar communication protocols, the multiple-port print device of the present invention achieves the aforementioned advantages.

According to a configuration of the third aspect of the present invention, detection of the job start mark and the job end mark defined according to the page description language and added to the print job data assures identification of job boundaries.

According to a configuration of the fourth aspect of the present invention, if the next job start mark is detected before detecting the job end mark, data prior to the job start mark is identified as the job end mark. This way, job boundaries of the print job data can be identified even without the job end mark.

According to a configuration of the fifth aspect of the present invention, upon creation of a spool file, a job management block corresponding to the spool file is linked to a job list comprising linked job management blocks. Accordingly, by displaying job list content and changing a link of the job management blocks in the job list, responding to a user's modification request on a job execution order, the job execution order can be easily modified.

According to a configuration of the sixth aspect of the present invention, if data of a job management block included in a displayed job list is modified through the operation on the operation panel, job content or a job status can be modified accordingly.

According to a configuration of the seventh aspect of the present invention, in response to the start of data reception at each communication interface, the event handler generates a thread of the job boundary detection program, and therefore, a single processor can perform a process of identifying print job data from each communication interface by each job boundary.

According to a configuration of the eighth aspect of the present invention, the print job data identified by the job boundary is generally spool-processed in a FIFO manner, but if the job start time is specified in the job management block, as an exception, the spool file thereof is provided to the image processing unit according to the job start time. This way, a user's request regarding the job execution start time can be appropriately processed.

These and other objects, embodiments, and advantages of the present invention are specifically set forth in or will become apparent from the following detailed descriptions of the invention when read in conjunction with the accompanying drawings.

DETAILED DESCRIPTION OF THE INVENTION

Exemplary embodiments of the present invention are explained below with reference to the accompanying drawings though these embodiments are not intended to limit the invention. Additionally, in some instances, well-known structures, interfaces, and processes have not been shown in detail in order not to unnecessarily obscure the present invention.

Figure 1:
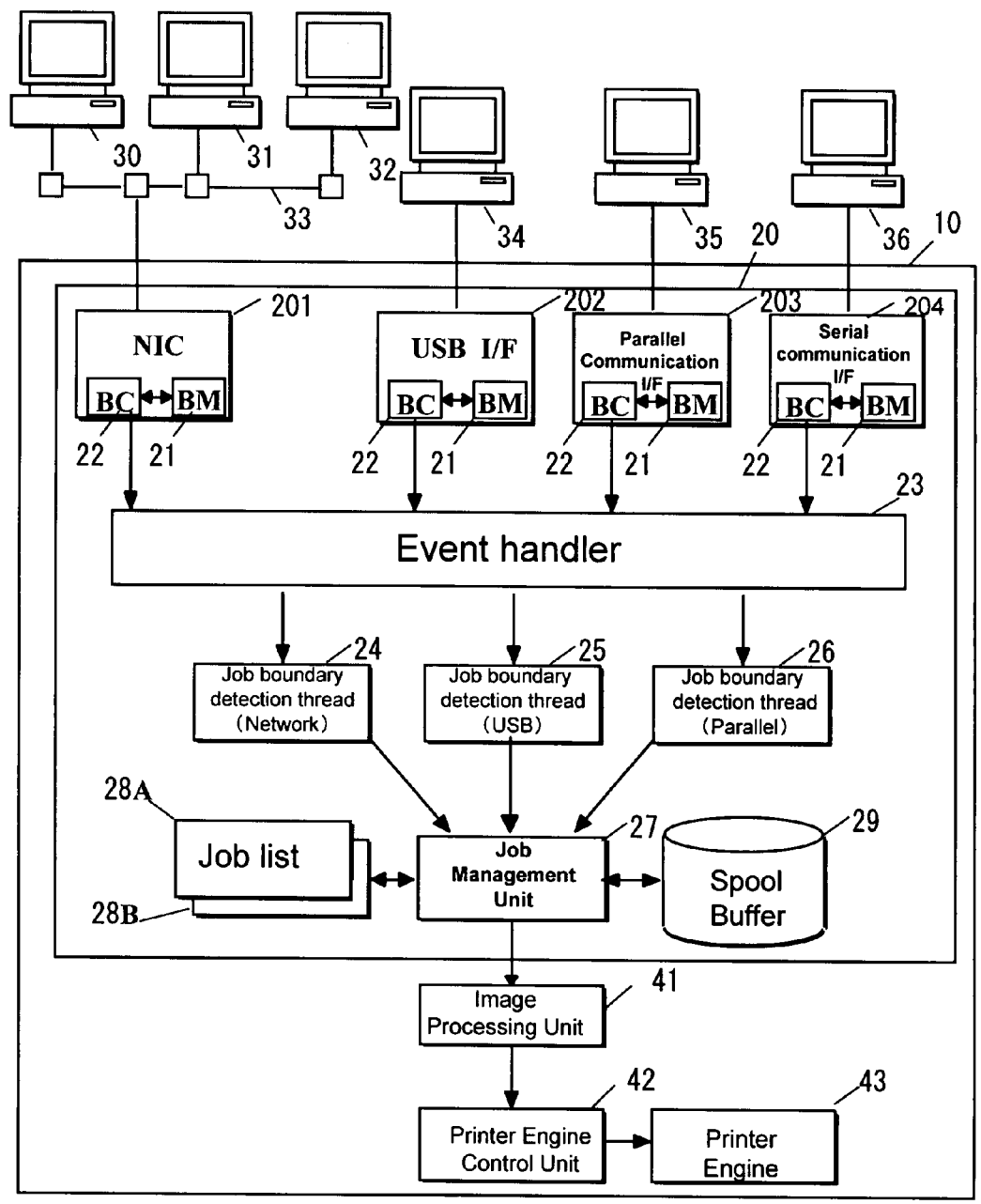
FIG. 1 is a schematic functional block diagram of a multiple-port printer relating to a preferred embodiment of the present invention.

FIG. 1 is a schematic functional block diagram of a multiple-port printer 10 in the present invention.

The printer 10 includes a job control unit 20 which is shared by the multiple host computers 30, 31 32, 34, 35, and 36.

Figure 2:
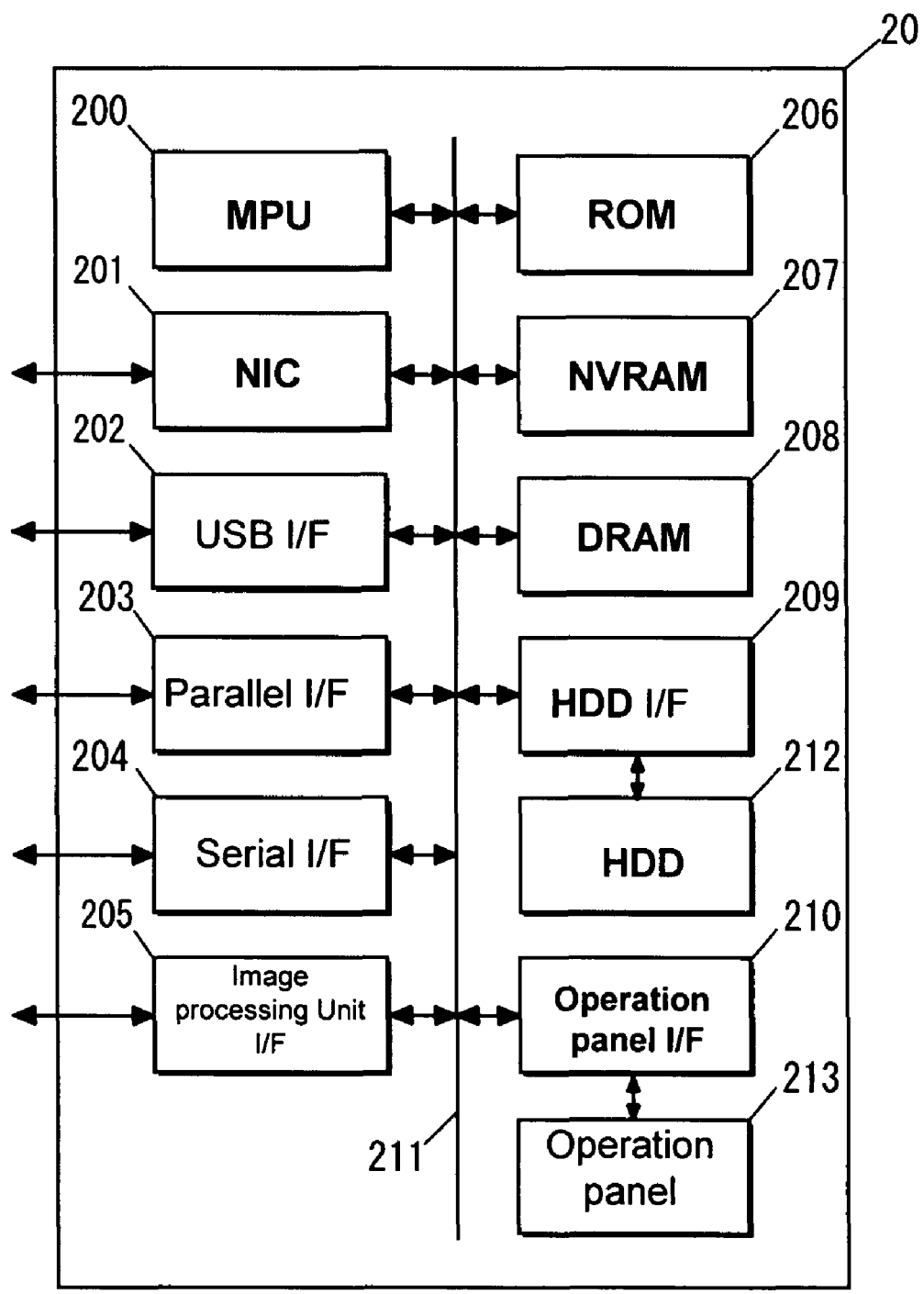
FIG. 2 is a hardware schematic block diagram of a job control unit illustrated in FIG. 1.

FIG. 2 is a hardware schematic block diagram of the job control unit 20.

A MPU (microprocessor unit) 200 is connected through a bus 211 with a NIC (network interface card) 201, a USB (universal serial bus) interface 202, a parallel interface 203, a serial interface 204, an image processing unit interface 205, a ROM (read-only memory) 206, a NVRAM (nonvolatile memory) 207, a DRAM (dynamic random access memory) 208, a HDD (hard disk drive) interface 209 and an operation panel interface 210. The HDD interface 209 and the operation panel interface 210 are connected with a HDD212 and an operation panel 213, respectively.

The ROM 206 stores a BIOS (Basic Input/Output System) program and a bootstrap loader. The NVRAM 207 stores an OS (operation system) which supports multiple threads and application programs which operate on a layer higher than that of the OS. The DRAM 208 is used as work areas, and the HDD212 is used to save files. The parallel interface 203 is the Centronics interface, and the serial interface 204 is the RS232C interface, for instance.

Each of the communication interfaces 201, 202, 203, and 204 of FIG. 1 includes a main unit to extract data from receive signal, and restore print job data by linking the data, buffer memory unit 21, and a buffer control unit 22 to store the print job data into the buffer memory unit 21. Each of the communication interfaces 201 through 204 includes a one-chip computer and executes processing at the main unit and the buffer control unit 22. If the main unit cannot identify the EOD.(end of data), which is the case for the USB interface and the Centronics interface, device drivers thereof add EOD when a wait time for data reception runs out.

Ports of the NIC 201 are connected with host computers 30, 31, and 32 through a communication media 33. Ports of the USB interface 202, the parallel interface 203, and the serial interface 204 is connected with the host computers 34, 35, and 36, respectively.

In FIG. 1, an event handler 23, job boundary detection threads 24, 25, and 26, and a job management unit 27 are a part of the application program. Job lists 28 A and 28B are stored in the HDD 212. A spool buffer 29 is an area in the HDD 212.

When each main unit of the communication interfaces 201, 202, 203, and 204 receives data, the each main unit generates an interrupt at the MPU 200. This interrupt process activates the event handler 23, and thereby a job boundary detection thread is generated. The thread corresponds to one of the communication interfaces 201 through 204 and at most four threads can operate parallelly in a time sharing manner. FIG. 1 illustrates the case that the event handler 23, based on the interrupt from the NIC 201, the USB interface 202 and the parallel interface 203, generates the job boundary detection threads 24, 25, and 26.

A job boundary detection thread reads out the receive data from the buffer memory unit 21 through the buffer control unit 22 of a communication interface corresponding to the thread, then first specifies the type of the page descriptive language (hereinafter "PDL"), performs detection processing of a job start mark and a job end mark used in the PDL, and identifies data between the job start mark and the job end mark as one print job data.

In the process, if the job boundary detection thread 24 detects the next job start mark before detecting the job end mark due to an absence of the job end mark, the job boundary detection thread 24 defines the data up to the job start mark, excluding the mark, as one print job data and accordingly identifies the job boundary of the data. Also, if a communication interface starts waiting for receiving the data before detecting the job end mark, and when the wait time exceeds the set time, the job boundary detection thread 24 judges that the job print data have reached its end, and accordingly identifies the job boundary of the print job data.

The job boundary detection processing is a faster process since verification of print job data is unnecessary.

Each time when a job boundary detection process for print job data finishes, the thread reports it to the job management unit 27 which also performs spool-processing. The job management unit 27, in response to the report, stores the print job data identified by the job boundary into the spool buffer 29 as a spool file, generates a job management block 40 as illustrated in the FIG. 3A, and links the block thereof to the job list 28A or 28B. That is, the job management unit 27 links, if the print job data does not include an output start time (indicated by 0), the job management block 40 to the last block of the job list 28A for it to be the last in order. If the print job data includes an output start time, the job management unit 27 links the job management block 40 to the job list 28A in an order of the output start time.

Figure 3A:
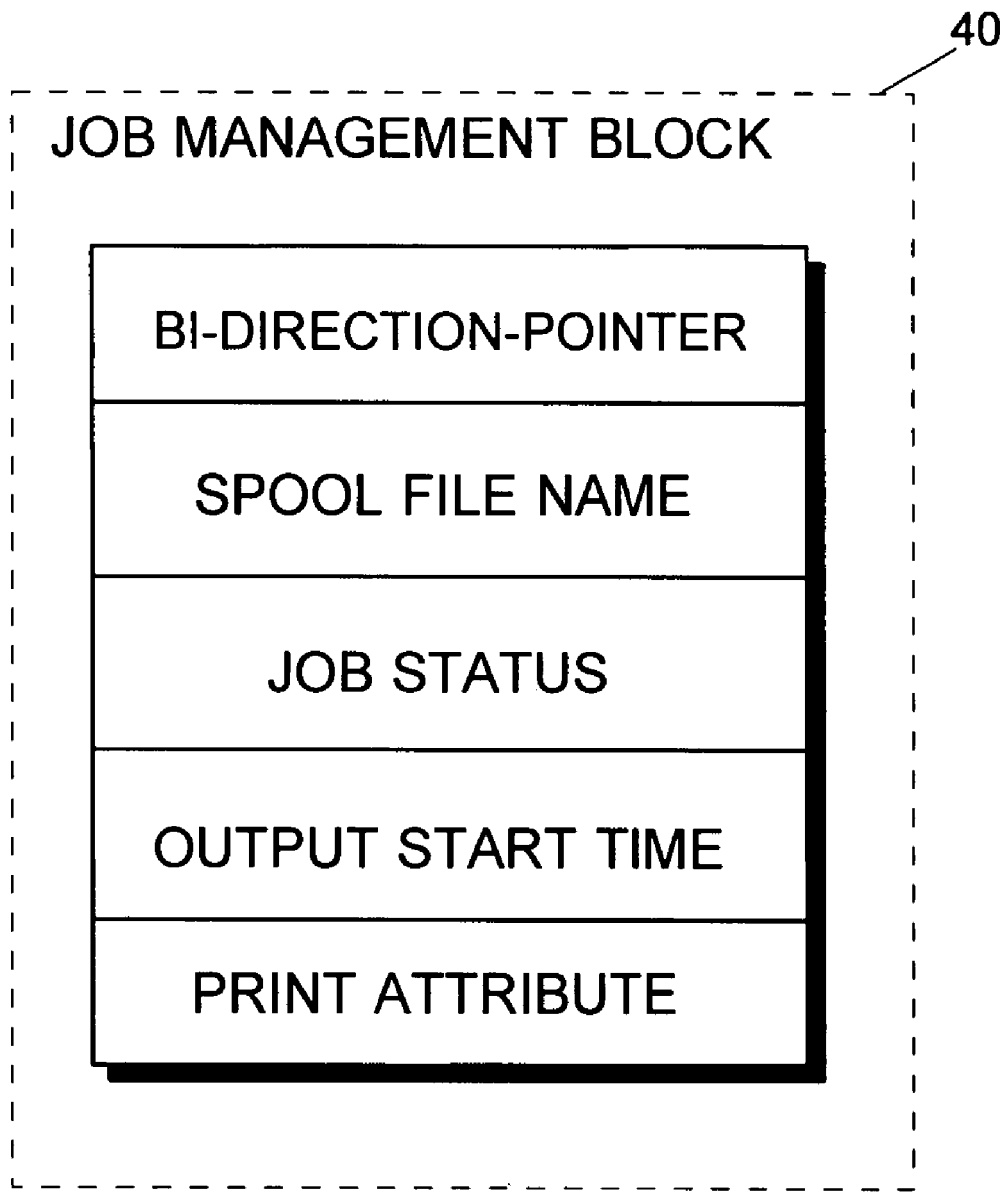
FIG. 3A is a descriptive diagram of a job management block.

Both the job lists 28A and 28B comprise a list configuration wherein the job management blocks 40 are linked to each other in both directions. By modifying a link thereof, modification of the job execution order can be easily accomplished. The job management block 40, as indicated in FIG. 3A, comprises data items of a pointer pointing in bi-directions, a spool file name, a job status, an output start time, and a print attributes.

Figure 3B:
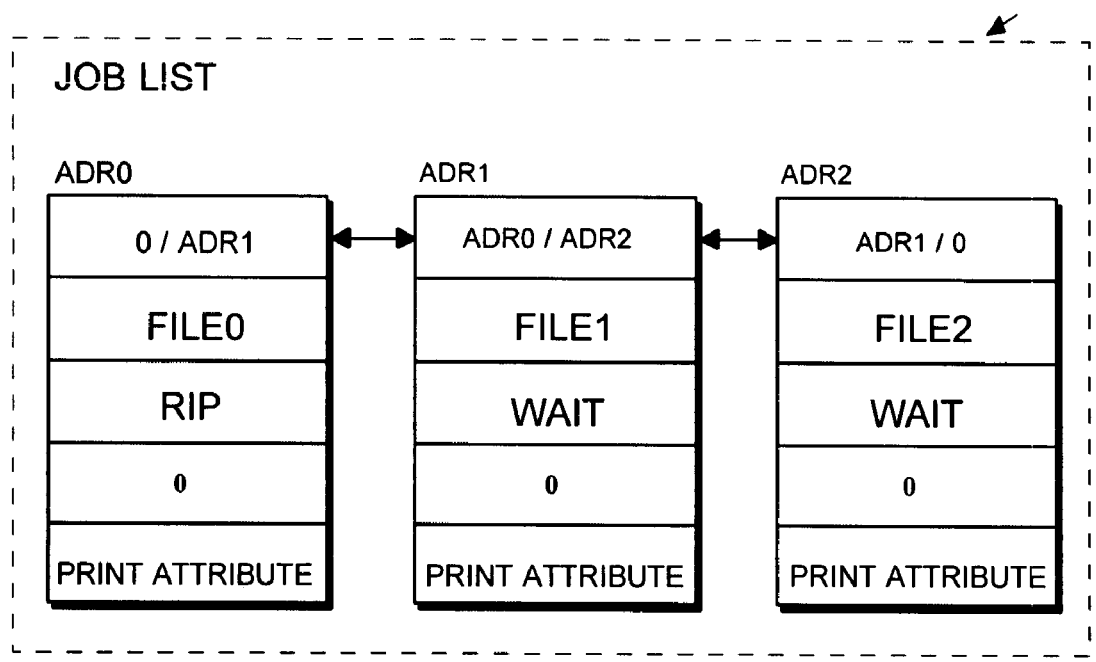
FIG. 3B is a descriptive diagram of a job list comprising job management blocks linked to each other in both directions the blocks not having a set output start time.
Figure 3C:
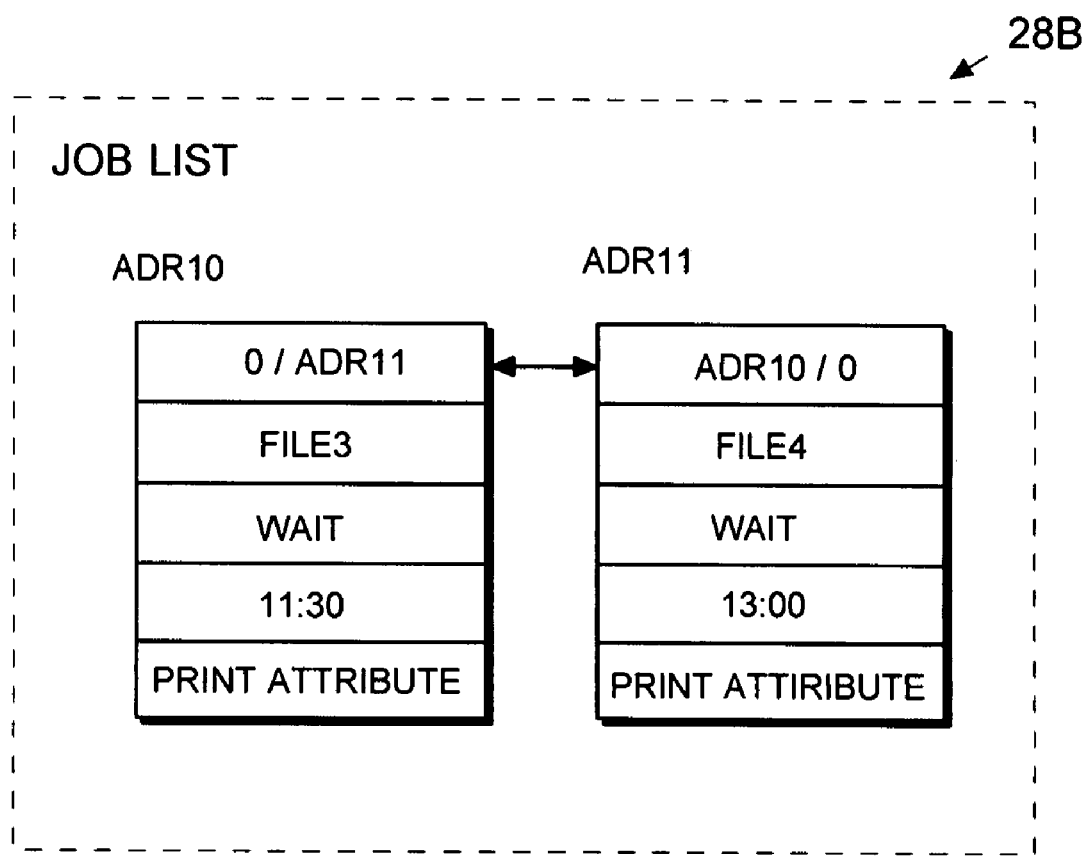
FIG. 3C is a descriptive diagram of a job list comprising job management blocks linked to each other in both directions the blocks having a set output start time.

The spool file name is named, for example, according to the job ID. The job status indicates states of waiting ("WAIT" in FIG. 3B and 3C), a RIP performing data conversion ("RIP" in FIG. 3B), "RIP process in halt," or "a job being completed." The output start time is specified by the user. If current time is on or past the output start time indicated in the head job management block in the job list 28B, the job management unit 27 executes a job interrupt by stopping the current job, linking the job management block having the output start time to the head of the job list 28A, and starting the linked job. The print attributes of the job management block 40 are described in the print command language (hereinafter "PCL") which manages each job. For example, when the PDL is the PCL, the print attributes are described in the printer job language (PJL) and are included in the print data. The print attributes are composed of multiple data such as of the number of copies, singe side or both sides printout, and a processing for including multiple pages per sheet or not, the processing type in the case of performing the processing, and toner density.

The use can conform and modify contents of the job lists 28A and 28B by operating the operation panel 213. For example, when the user operates the operation panel 213 to modify the job execution order or the output start time, set the output start time, or modify the print attributes, the job management unit 27 modifies or adds data of appropriate items in the job list 28A or 28B, or modifies the link of the job management blocks in response to the operation. If the user operates the operation panel 213 to cancel the job, the job management unit 27 deletes the job management block of the job from the job management list 28A or 28B. If the user operates the operation panel 213 to pause a job, the job management unit 27 halts the processing of the job and modifies the job status in the job management block to "RIP process in halt."

The job management unit 27 reads, when an image processing unit 41 is in the ready state, the spool file name indicated in the head job management block in the job list 28A, reads out the content of the file from the spool buffer 29 and provides the file content to the image processing unit 41, and modifies the job status in the job management block to the "RIP."

The image processing unit 41 is connected to the image processing unit interface 205 in FIG. 2. The image processing unit 41 comprises a processor, a memory connected to the processor, and a Raster Image Processor (RIP), and executes the process according to a program stored in the memory.

More specifically, the image processing unit 41 performs a processing for realizing multiple pages per page, and the like among the print attributes included in the print job data received from the job management unit 27, then converts the data into intermediate data that the RIP can interpret, and provides the converted data to the RIP to be further converted into bitmap data. The image processing unit 41 further provides the bitmap data to a printer engine control unit 42.

The printer engine control unit 42 comprises a one-chip computer and converts the bitmap data into a video signal by adding a synchronization signal and provides the video signal to a printer engine 43. Then, in the printer engine 43, a photoconductor drum is exposed, the latent image is developed with a toner, and the image is transferred onto a paper. The paper is delivered by a paper transportation mechanism (not shown).

According to the preferred embodiments of the present invention, by reading print job data stored in the buffer memory unit 21 from the multiple communication interfaces 201 through 204 of individually dissimilar communication protocols, and detecting the job start mark and the job end mark added to the print job data, the print job data is detected by each job boundary. The job management unit 27 stores the print job data identified by the job boundary into the spool buffer 29 as a spool file to spool-process the identified print job data between the spool buffer 29 and the image processing unit 41. Accordingly, efficient job management can be performed for individual jobs.

Additionally, if the next job start mark is detected before detecting the job end mark, data prior to the job start mark is defined as the job end mark. Accordingly, print job data can be identified by the job boundary even without the job end mark.

Furthermore, upon creation of a spool file, the job management block 40 corresponding to the spool file is linked to one of the job lists 28A and 28B. Accordingly, by displaying content of one of the job lists 28A and 28B and changing a link of a job management block in the job list 28A or 28B, responding to a user's modification request on a job execution order, the job execution order can be easily modified.

Yet furthermore, in response to the start of data reception at each of the communication interfaces 201, 202, 203, and 204, the event handler 23 generates a thread of the job boundary detection program. Accordingly, one single processor of the processor 200 can perform the job boundary detection process for print job data from each communication interface.

Yet furthermore, although the print job data identified by the job boundary is generally spool-processed in a FIFO manner, if the job start time is specified in the job management block 40, as an exception, a spool file thereof is provided to the image processing unit 41 according to the job start time; Accordingly, this configuration can conform to a user's request on job execution start time.

The present document incorporates by reference the contents of Japanese priority document, Japanese Patent Application No. 2006-133689, filed in Japan on May 12, 2006.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A multiple-port print device, comprising:
   multiple communication interfaces;
   buffer memory units;
   buffer control units which store print job data received from each communication interface into each of the buffer memory units;
   an image forming unit which forms an image onto a paper based on bitmap data; and
   an image processing unit which converts print data corresponding to a spool file into bitmap data and provides the data thereof to the image forming unit; and
   the multiple-port print device, further comprising:
   a job boundary detection unit which reads out print job data stored in each of the buffer memory units and identifies the print job data by each job boundary, which job boundary detection unit identifies print job data by each job boundary, by detecting a job start mark and a job end mark defined according to a page description language and added to the print job data, wherein, if the job boundary detection unit detects the next job start mark before detecting a job end mark due to an absence of a job end mark, the job boundary detection unit defines the data up to the job start mark, excluding the job start mark, as one print job data and accordingly identifies the job boundary of the data, and
   wherein if a communication interface starts waiting for receiving data before detecting a job end mark, and when wait time exceeds a set time, the job boundary detection unit judges that the job print data have reached its end, and accordingly identifies the job boundary of the print job data;
   a spool buffer; and
   a job management unit which stores the print job data identified by the job boundary as a spool file into the spool buffer to spool-process the identified print job data between the spool buffer and the image processing unit.

2. The multiple-port print device of claim 1, wherein:
   the multiple communication interfaces operate according to individually dissimilar communication protocols.

3. The multiple-port print device of claim 2, further comprising:
   job management blocks each of which includes data items of a spool file name and a job status indicating states of waiting, executing, and being completed; and
   a job list comprising job management blocks linked to each other.

4. The multiple-port print device of claim 3, wherein:
   the job management unit links, upon creation of a spool file, a job management block corresponding to the spool file with the job list comprising linked job management blocks, and performs spool-processing based on the job list.

5. The multiple-port print device of claim 3, further comprising:
   an operation panel which displays the job thereon; and
   a job modification unit which, when data of the job management block included in a displayed job list is modified through an operation on the operation panel, modifies one of content and status of the job accordingly.

6. The multiple-port device of claim 5, further comprising:
   a processor;
   a buffer control program;
   a memory unit for storing the buffer control program, the memory unit being connected to the processor, wherein the job boundary detection unit and the job management unit include the processor and the memory unit;
   a job boundary detection program which identifies the print job data stored in the buffer memory units by each job boundary; and
   an event handler which, in response to the start of data reception at each communication interface, generates a thread of the job boundary detection program, wherein the buffer control program includes the job boundary detection program and the event handler, and wherein the processor operates, according to the buffer control program, to execute operations at the buffer control units.

7. The multiple-port print device of claim 6, wherein:
   the job management block further includes a data item of a job start time; and
   the job management unit generally spool-processes the print job data identified by the job boundary in a FIFO (first-in-first-out) manner, but if the job start time is specified in the job management block, the job management unit provides the spool file, as an exception, to the image processing unit according to the job start time.

8. The multiple-port print device of claim 7, wherein each of the multiple communication interfaces includes a main unit to extract data from a received signal, and restore print job data by linking the data;
   each of the multiple communication interfaces comprises a one-chip computer and executes processing at the main unit and the buffer control unit; and
   if the main unit cannot identify the EOD (end of data) for a parallel communication interface, a device driver thereof adds EOD (end of data) when a wait time for data reception runs out.

9. The multiple-port print device of claim 8, wherein the parallel communication interface is a USB interface and/or a Centronics interface.

* * * * *